Sept. 15, 1964  H. E. ETHRIDGE  3,148,476
OUTBOARD FISH LIVEWELL
Filed Aug. 24, 1961

INVENTOR

HARRY ETHRIDGE

BY *Cushman, Darby & Cushman*
ATTORNEYS

United States Patent Office 3,148,476
Patented Sept. 15, 1964

3,148,476
OUTBOARD FISH LIVEWELL
Harry E. Ethridge, 15 Homestead Drive,
Mount Vernon, Ill.
Filed Aug. 24, 1961, Ser. No. 133,727
3 Claims. (Cl. 43—55)

This invention relates generally to an outboard fish livewell and more particularly to a livewell having an improved support structure.

Prior to this time, livewells have been attached to fishing boats in numerous ways. These have included merely tying a floating livewell to the boat by means of a length of rope and pulling it therebehind. In other instances the livewell has been swingably mounted by a bracket on the gunwale, or has been tied to the side of the boat by means of rope.

Accordingly, an object of the present invention is the provision of an outboard fish livewell having a unique handle structure, which can be used to carry the livewell to and from the boat and to support the livewell on the gunwale of the boat.

Another object of this invention is the provision of a livewell having a supporting structure to securely hold the same to the side of a boat, but which will allow the livewell to pivot within defined limits.

A still further object of this invention is a fish livewell having adjustable supporting means for varying its height above the water.

A still further object of this invention is the provision of a livewell having an improved handle structure comprising a pair of support bars attached to opposite sides of the livewell and extending beyond its top surface and having a tubular member secured to the top ends of the support bars for receiving rod means attached to the gunwale of a boat.

Other objects and advantages will be apparent from the following detailed description taken in connection with the accompanying drawings, in which.

Figure 1:
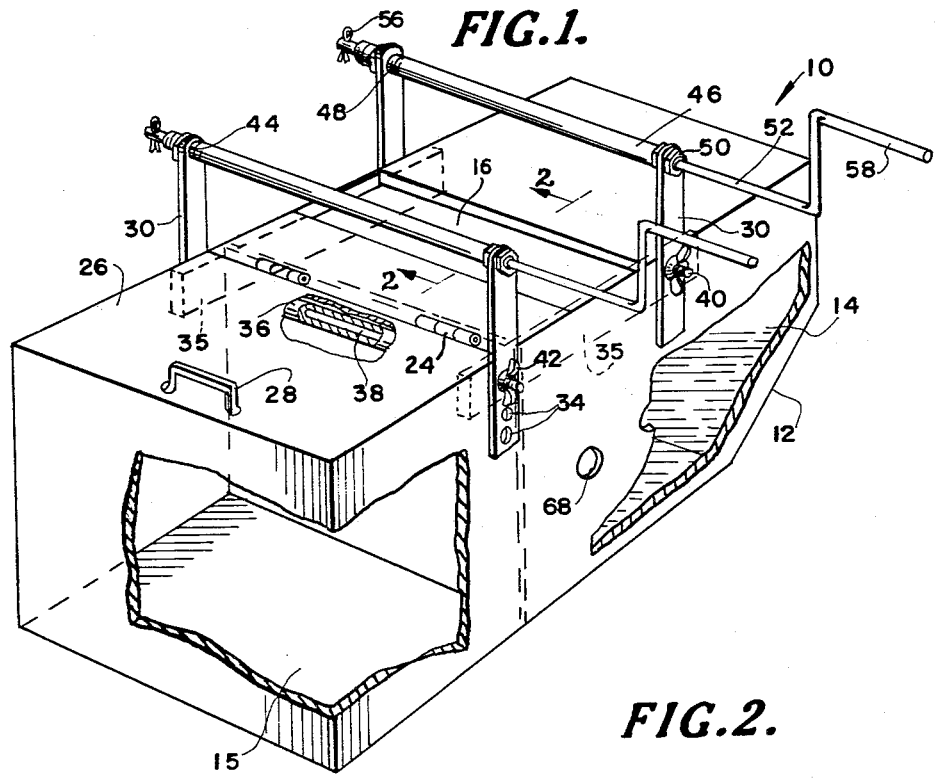
FIGURE 1 is a perspective view of the outboard fishing livewell.
Figure 2:
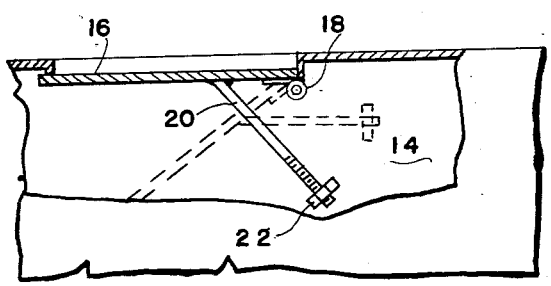
FIGURE 2 is a cutaway sectional view taken along lines 2—2 of FIGURE 1 illustrating in detail the self-closing lid of this invention.
Figure 3:
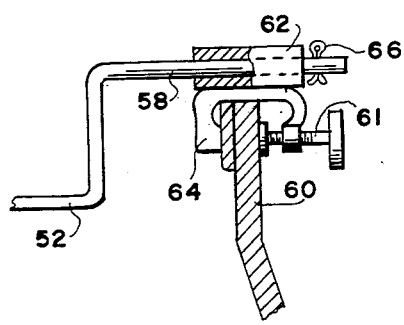
FIGURE 3 is a partial side elevational view partly in section showing the means for securing the livewell to the boat gunwale.

Referring now to the drawings, FIGURE 1 illustrates the outboard fish livewell shown generally at 10, having an elongated box-like structure tapering upwardly and forwardly as at 12. The livewell 10 has a front compartment 14 for receiving live fish shortly after they are caught. Lid 16 is hinged as at 18 (FIGURE 2) and opens downwardly to provide access to the compartment 14. Fastened to the forward portion of the lid 16 as by welding or other suitable means and extending forwardly and downwardly therefrom, as is clearly shown in FIGURE 2, is a bolt or rod 20 suitably threaded to receive a nut 22. The nut is of such a weight as to counterbalance lid 16 and may be screwed on the bolt 20 to adjust the amount of counterbalance.

A rearward compartment 15 is also provided, having a lid 26, hinged as at 24, which is opened upwardly by handle 28. Crushed or Dry Ice may be placed in the rearward compartment 15 which is suitably insulated for keeping such contents as fish bait, lunches, or beverages cold.

Attached to both sides of the livewell are brackets 30 extending beyond the upper surface 32 of the box-like structure. These brackets 30 have a number of holes 34 extending therethrough for adjustably attaching the same to the box structure. Engaging the inner sides of the box-like structure adjacent holes 34 of the bracket members and the associated holes passing through the box-like structure are reinforcement bars 35. Extending the width of the container and engaging each of the reinforcement bars at both ends thereof, are tubular members 36. A rod member 38 passes through each tubular member 36, through openings suitably located in the reinforcement members and in the sides of the box-like structure, and through the holes 34 of the bracket members 30. The ends of the rod members are threaded as at 40 to receive wing nuts 42 or other suitable fastening means for securing the brackets to the box structure. Rods 38 are removable endwise from tubular members 36 for purposes of adjustment.

Adjacent the top ends of the bracket members 30 are located openings 44 for receiving the ends of the tubular members 46 which are threaded at the ends as at 48. Nuts 50 secure the tubular members 46 to the brackets 30.

Passing through the tubular members 46 are rods 52. These rods have diametrical holes located in their outer ends to receive cotter pins 56 to retain the livewell upon the rods 52.

The inner ends 58 of the rods 52 extend to a position above the gunwale 60, each passing through a tubular member 62 attached to clamp 64 as by welding or other suitable means. These clamps 64 are manually engageable with the gunwale 60 by means of screws 61. The ends 58 of the rods 52 are held within the tubular members 62 by means of cotter pins 66 which pass through holes suitably drilled in the ends 58.

The livewell may be easily detached from rods 52 by removing cotter pins 56 and sliding tubular members 46 outwardly of the boat gunwale. The box may then be carried under the arm by means of the tubular members 46 which serve as handles.

It should be noted that all contact points of the livewell with the boat are preferably protected with rubber or some like material so the boat will not be marred should the livewell strike the boat.

The front end 12 acts to raise the livewell to the surface of the water when the boat is in motion. The open ports 68 in the sides of the livewell permit fresh water to pass into the forward compartment in order to keep the fish alive. If the boat is to be moved at a substantial speed, it is advisable to raise the livewell free of the water. This is accomplished by bringing the two supporting handles 46 together and fastening them together with a hook or other suitable means. This will raise the livewell some distance; additionally, the force of the water acting on the forward taper 12 will tend to raise the livewell to an even higher position.

Thus, I have disclosed a new outboard livewell having a new and improved support structure which serves a two-fold purpose, first as means for carrying the livewell to and from the boat, and secondly as means for supporting the livewell on the boat.

It is to be understood, however, that while there is shown and described herein a preferred embodiment of the invention, the same is susceptible to certain changes fully comprehended by the spirit of the invention as herein described and the scope of the appended claims.

What is claimed is:

1. An outboard fish livewell comprising: an elongated box-like container, said container including a first substantially imperforate compartment and a second compartment having apertures in the sides thereof substantially spaced from the bottom of said container; a pair of spaced U-shaped handle members, each of said members having a body portion and a pair of end portions, said body portion being tubular and said end portions being swingably mounted on opposite sides of said container; a rod member carried in each of said tubular body portions and having a free end extending beyond said body portion; and means for securing the free ends of said rod members to the gunwale of a boat, the free ends of said rod members being bent such that said livewell may be raised relative to said gunwale by bringing together the body portion of said handle members.

2. The outboard fish livewell set forth in claim 1 wherein the free ends of each of the rod members are bent to include a portion extending substantially perpendicular to the body portion of the associated handle member and a terminal portion extending substantially parallel to said body portion.

3. The outboard fish livewell set forth in claim 1 wherein said securing means comprises clamp means mounted on the gunwale of a boat; tubular members fastened securely to said clamp means for receiving the free ends of said rod means; and means for retaining said rod means within said tubular members.

References Cited in the file of this patent

UNITED STATES PATENTS

| | | |
|---|---|---|
| 1,170,414 | Christensen | Feb. 1, 1916 |
| 2,272,569 | Luhmann | Feb. 10, 1942 |
| 2,485,684 | Aldredge | Oct. 25, 1949 |
| 2,560,381 | Babington | July 10, 1951 |
| 2,663,533 | Keiser | Dec. 22, 1953 |
| 2,765,577 | Scruggs | Oct. 9, 1956 |
| 2,920,855 | Giebel | Jan. 12, 1960 |
| 3,009,281 | Unger | Nov. 21, 1961 |
| 3,025,996 | Habicht et al. | Mar. 20, 1962 |